(12) United States Patent
Oksman

(10) Patent No.: US 8,203,983 B2
(45) Date of Patent: Jun. 19, 2012

(54) MULTI-DOMAIN NETWORK WITH CENTRALIZED MANAGEMENT

(75) Inventor: Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 898 days.

(21) Appl. No.: 11/739,324

(22) Filed: Apr. 24, 2007

(65) Prior Publication Data

US 2008/0225687 A1     Sep. 18, 2008

Related U.S. Application Data

(60) Provisional application No. 60/918,202, filed on Mar. 15, 2007.

(51) Int. Cl.
*G08C 17/00* (2006.01)
(52) U.S. Cl. .......................... 370/311; 370/328; 370/338
(58) Field of Classification Search .................. 455/560, 455/501, 561, 423, 447; 370/480, 318, 295, 370/294, 329
See application file for complete search history.

(56) References Cited

U.S. PATENT DOCUMENTS

| | | | |
|---|---|---|---|
| 5,371,734 A | 12/1994 | Fischer | |
| 5,953,661 A * | 9/1999 | Schwinghammer et al. | 455/423 |
| 6,167,237 A * | 12/2000 | Rapeli | 455/63.1 |
| 6,198,928 B1 * | 3/2001 | Keurulainen et al. | 455/436 |
| 6,463,294 B1 * | 10/2002 | Holma et al. | 455/513 |
| 6,741,564 B2 * | 5/2004 | Luddy | 370/232 |
| 6,891,857 B1 * | 5/2005 | Nevo et al. | 370/480 |
| 7,006,828 B1 * | 2/2006 | Czaja et al. | 455/442 |
| 7,031,712 B2 * | 4/2006 | Takano et al. | 455/442 |
| 7,130,635 B2 * | 10/2006 | Cerwall et al. | 455/450 |
| 7,328,021 B1 * | 2/2008 | Satapathy | 455/445 |
| 7,417,963 B2 * | 8/2008 | Chen et al. | 370/311 |
| 7,734,255 B2 * | 6/2010 | Matsunaga | 455/63.1 |
| 7,826,796 B2 * | 11/2010 | Matsunaga | 455/63.3 |
| 2001/0053695 A1 * | 12/2001 | Wallentin | 455/436 |
| 2002/0031100 A1 * | 3/2002 | Sashihara | 370/294 |
| 2003/0134655 A1 * | 7/2003 | Chen et al. | 455/522 |
| 2004/0156335 A1 * | 8/2004 | Brethour et al. | 370/329 |
| 2005/0122948 A1 * | 6/2005 | Miyazaki | 370/343 |
| 2005/0141562 A1 * | 6/2005 | Chen et al. | 370/480 |
| 2006/0003703 A1 * | 1/2006 | Yahagi | 455/69 |
| 2006/0052565 A1 | 3/2006 | Yoshioka et al. | |
| 2007/0004419 A1 * | 1/2007 | Ji et al. | 455/447 |
| 2007/0081514 A1 * | 4/2007 | Shirokura et al. | 370/350 |
| 2007/0147287 A1 * | 6/2007 | Jalil et al. | 370/329 |
| 2007/0155431 A1 * | 7/2007 | Munzner et al. | 455/560 |
| 2007/0223406 A1 * | 9/2007 | Li et al. | 370/278 |
| 2009/0016318 A1 * | 1/2009 | Karaoguz et al. | 370/347 |

FOREIGN PATENT DOCUMENTS

| | | | |
|---|---|---|---|
| EP | 1434456 A2 * | 6/2004 | |
| JP | 2004207839 A | 7/2004 | |
| JP | 2006166487 A | 6/2006 | |

\* cited by examiner

*Primary Examiner* — Michael J Moore, Jr.
(74) *Attorney, Agent, or Firm* — Eschweiler & Associates, LLC

(57) ABSTRACT

One embodiment relates to a method for coordinating signals within a multi-domain network. At least one node within one network domain of the multi-domain network is identified, where the one node is affected by interference due to another node of another network domain of the multi-domain network. Global signals are provided to the one network domain to coordinate domain signals within that network domain to limit the interference from the another node. Other systems and methods are also disclosed.

10 Claims, 4 Drawing Sheets

MULTI-DOMAIN NETWORK WITH CENTRALIZED MANAGEMENT

RELATED APPLICATION

This application claims priority to U.S. Provisional Application Ser. No. 60/918,202 filed on Mar. 15, 2007, entitled "MULTI-DOMAIN NETWORK WITH CENTRALIZED MANAGEMENT."

FIELD OF THE INVENTION

The present invention relates to communication systems and methods related thereto. More specifically, the present invention relates to multi-domain networks and methods for coordinating signals within a multi-domain network.

BACKGROUND OF THE INVENTION

Various access technologies, such as digital-subscriber lines (DSL, like ADSL or VDSL), passive optical networks (PON), and others, provide a high-speed data services from the local exchange to the customer premises. A home network (HN) is one way to distribute broadband services over the customer residence. In current practice both wireline and wireless HN solutions are available. For both wireless and wireline solutions, HN nodes communicate with a residential gateway (RG) to receive broadband service. The RG, in turn, is connected to the access network termination at the customer premises (CP), called "CPE". CPE is the source of broadband services distributed over the residence. Besides distribution of broadband services, HNs communicate to each other to provide various private high-speed data applications inside the CP, such as connections between multiple TVs and a digital video-recorder (DVR), between components of security system, private file transfer system, etc.

A typical home contains several types of wiring such as phone wiring, coaxial cable lines, electrical power lines, or some type of dedicated high-speed data wiring (e.g., Cat 5). Many existing HN solutions utilize one type of wiring. For instance, HomePlug technology deals with power lines, MOCA technology deals with coax cable, and HPNA (Home Phone-line Access Network) technology originally addressed phone line wiring but was recently amended to use coax cable as well. Other existing HN solutions utilize wireless connections (e.g., WiFi technology, based on IEEE standard 802.11). However, it is widely accepted that neither existing wireline or wireless HN solutions can simultaneously serve a sufficient number of nodes inside the home and fail to provide sufficient throughput to deliver the required variety of modern services, including high speed applications like HDTV to multiple points on one end and multiple low-bit rate automation devices on the other end.

To increase the throughput of HNs, it was proposed to simultaneously employ all available types of home wiring (phone lines, power lines, coax cable) to arrange multiple sub-networks (or network domains) so that each sub-network can utilize the transport capability of a specific type of wiring, while the whole HN will utilize all the available media. In the same way, it was also proposed to arrange multiple wireless hot-spots inside the house (wireless sub-networks), interconnected by wired media, to significantly improve the coverage of the wireless access. With an appropriate combination of wire-line and wire-less sub-networks, high-speed broadband services can be delivered to any point inside the house.

HNs containing multiple sub-networks that communicate over wireless or different types of wired media are known in the prior art. In the prior art, these sub-networks, which may be referred to simply as "domains" herein, can share the same wiring or utilize different wiring, but are routed in close proximity from each other. In such a HN, signals from one domain will propagate into other domains, causing interference between communicated signals (crosstalk). This interference usually erases both domains' signals, and retransmission is required.

Therefore, one issue with these existing HN solutions is that domains may interfere with each other, mutually reducing each other's performance. If transmission signals from one domain penetrate to another domain with considerable power, some signals in the victim network can be completely erased due to interference.

Another issue in existing HNs is how to efficiently allocate services and resources among the domains. Thus, services and communication resources to those domains should be set to meet the quality of service (QoS) requirements of each service in the most efficient way.

In addition, prior art sub-networks are arranged in a way that signals used by HN nodes in one domain are not supposed to propagate to another domain. Following this definition, different domains either use different types of media (e.g., one over coax wiring, another over phone-line wiring, and another over power line wiring), or use orthogonal signals over the same medium (e.g., different frequency channels over coax.) With this approach, there is still an issue with crosstalk between different types of media. For example, a power line can cause crosstalk on phone lines, or one frequency channel on a coax cable can cause crosstalk on another channel of the coax cable (due to poor out-of band signal attenuation). This crosstalk may cause distortions and even erase signals transmitted over the victim medium, thus reducing the bit rate and impacting the QoS.

To avoid the issue of interference and/or crosstalk, it was proposed to provide coordination between signals of different domains. However, these methods of coordination rely on mutual "politeness" of all sub-networks, assuming none of the subnetworks is taking more bandwidth than is needed to provide QoS. This approach is insufficient because channel characteristics between nodes of the HN are highly dynamic (i.e., change as new devices are turned on or switched off and due to noise variations). As a result, each domain will tend to reserve maximum bandwidth resources to provide QoS in case channel characteristics deteriorate. Thus, the politeness concept may not work if the total available bandwidth resource has relatively little margin. If the total available bandwidth resource is less than the bandwidth requested by a domain, it is not clear how a compromise can be settled.

Thus, these problems, as well as other problems, could be resolved by coordination devices and methods which resolve conflicts between network domains (sub-networks) to achieve the best overall result.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment relates to a method for coordinating signals within a multi-domain network. At least one node within one network domain of the multi-domain network is identified, where the one node is affected by interference due to another node of another network domain of the multi-domain network. Global signals are provided to the one network domain to coordinate domain signals within that network domain to limit the interference from the another node.

The following description and annexed drawings set forth in detail certain illustrative aspects and implementations of the invention. These are indicative of but a few of the various ways in which the principles of the invention may be employed.

DETAILED DESCRIPTION OF THE INVENTION

Figure 1:
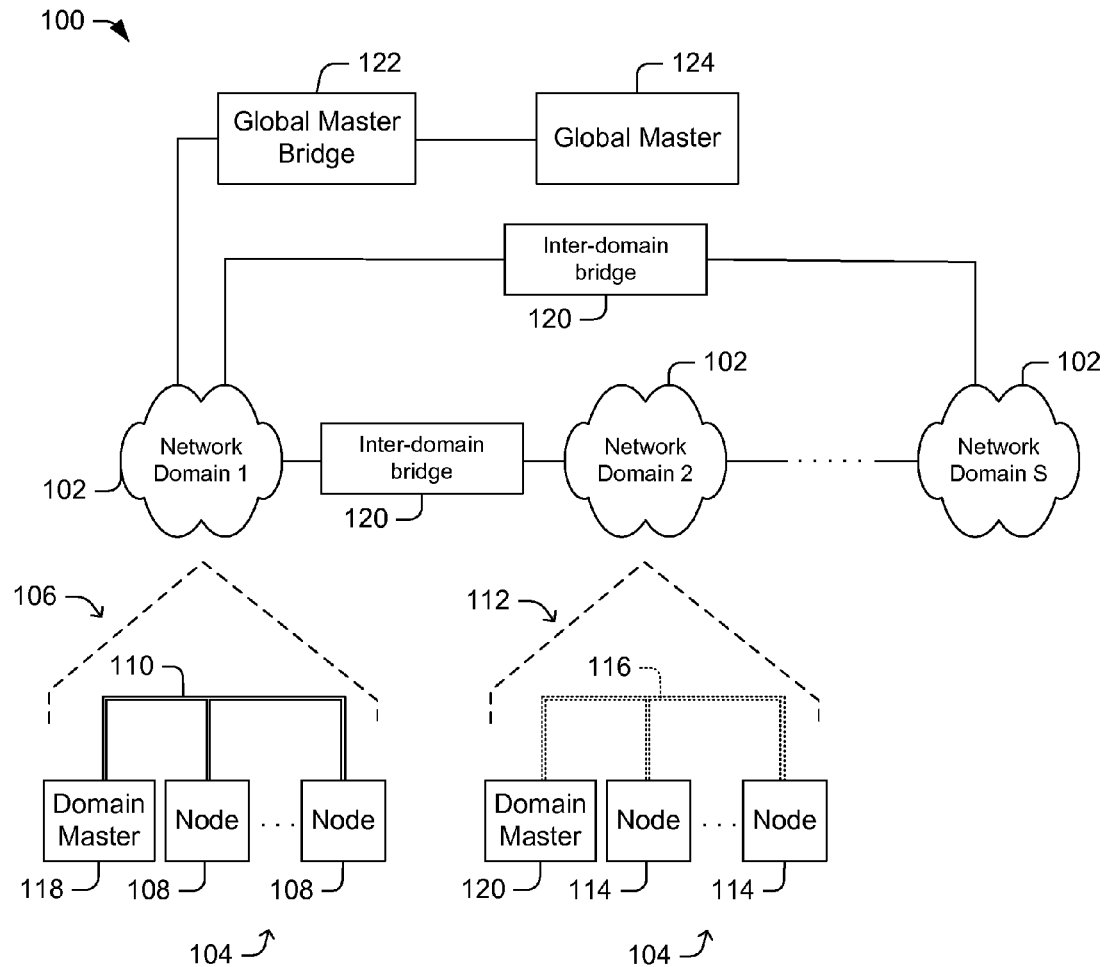
FIG. 1 illustrates one embodiment of a network.

The present invention will now be described with reference to the drawings wherein like reference numerals are used to refer to like elements throughout, and wherein the illustrated structures are not necessarily drawn to scale. In addition, although various embodiments may be described and illustrated with reference to a hardware structure, the functionality and corresponding features of the system can also be performed by appropriate software routines or a combination of hardware and software. Thus, the present invention should not be limited to any particular implementation and shall be construed to cover any implementation that falls within the spirit and scope of the claims.

Generally speaking, aspects of the invention may include, but are not limited to: coordination between wireless or wireline networks—for example, by frequency and time; increase of network throughput by increasing the number of domains by establishing multiple channels in coax cable; sharing services and interaction between wireline and wireless domains of the same network; and coordination between high-bit-rate and high-quality services (e.g., TV or audio) with low-bit-rate and low-low quality services (e.g., home automation or printing) to better exploit the available media and simplify network transceivers.

Aspects of this invention provide systems and methods in which a global master (GM) coordinates communication between domains (sub-networks). Specifically, mechanisms relating to frequency coordination, time coordination, spatial coordination, and coordination of transmit power levels are described.

FIG. 1 shows a multi-domain network 100 which consists of several domains 102, each of which can support either wireless communications (wireless domain), or wireline communications (wireline domain) between nodes 104. In wireline domains, such as wireline domain 106, the domain could include two or more wireline network nodes 108 connected to a specific type of wired medium 110 (e.g., powerline, phone-line, coax, or a mixture of those). This configuration allows the wireline nodes 108 to communicate with each other through this wireline medium 110 either directly or through an intermediate node. In wireless domains, such as wireless domain 112, the domain could include two or more wireless network nodes 114 which are intended to communicate with each other over a wireless medium 116 (e.g., the atmosphere), but not with nodes of other domains. In addition, each domain 102 can have an access point where all traffic is groomed. In domains 106, 112, the access point could be one of the nodes 108, 114, respectively or a domain master 118, 120, respectively. For example, in one embodiment, the domain master 118 can act as an access point for wireline network 106 and data can be communicated to and from each wireline node 108 via the domain master 118. In other embodiments, where a domain can operate without a domain master (non-coordinated transmission, similar to Ethernet), one of the nodes can serve as an access point grooming all traffic and further relaying it to other nodes of the domain or outside the domain.

The domains 102 are connected to one another by inter-domain bridges 120, which provide communication of logical signals between the domains. Some bridges could connect like domains (e.g., a wireline domain to another wireline domain), while other bridges could connect un-like domains (e.g., a wireline domain to a wireless domain).

Ideally, nodes of different domains either use different types of media or use signals that are orthogonal, and therefore these nodes do not directly talk to each other. Thus, signals exchanged within a given domain may be referred to as domain signals, which are intended to be used for communication inside a single network domain. In real world implementations, however, domain signals may penetrate into other domains and result in interference in those domains. This interference or noise may be called "crosstalk". For instance, in FIG. 1, if domain signals transmitted by some nodes of Domain 1 propagate into Domain 2, they can reduce the performance in some connections of Domain 2. For instance, such a scenario could arise if Domains 1 and 2 are both wireless domains, or if Domain 1 and Domain 2 are both wireline domains and Domain 1 uses a powerline and Domain 2 uses a phone-line. Notice that inter-domain bridges 120 provide a logical connection (as upper protocol layers) and thus don't typically cause crosstalk. Similarly, GM bridge 122 typically will not cause crosstalk.

To provide high quality of service (QoS), it is usually desirable to avoid interference between signals (e.g., packets or frames) transmitted over the media. For the multi-domain network 100 described above, a domain master (e.g., 118, 120) coordinates resources inside the domain. The domain master may limit the signals that propagate between domains, thereby limiting interference. A domain managed by a domain master may also be called a "synchronized domain" because nodes are transmitting signals in coordinated way, thus avoiding interference. More generally, the domain master allocates resources (e.g., transmission time, transmission bandwidth, transmission power) for each node of the domain it manages. In one embodiment, every domain includes one domain master that controls the domain. The domain master is responsible for providing required QoS to all clients connected to the domain, so that frames transmitted by clients with high QoS requirements would not collide with other frames. In another embodiment, usually where specific QoS measures are not required (for instance, if the capacity of the medium where domain is arranged is much higher than the required for communications inside domain), domain master may not be needed. This, however, still may result in the domain interfering with other domains.

To provide reliable QoS support in communication, the domain master will try to apply high margins on the available resources (bandwidth, time, and transmit power budget), regardless of the impact on nodes of other domains, since no information on this disturbance is available for the master. With "selfish" domain masters, domains may disturb each other or even make mutual coexistence impossible. This is especially noticeable in domains built over power lines (where all domains may be physically connected) and wireless domains (due to signal propagation through the atmosphere or other medium).

To reduce or avoid crosstalk between domains, signals used by domains should be coordinated. To achieve this coordination, the network 100 includes at least one global master (GM) 124 that may provide global signals to one or more domain masters 106 to coordinate communication between various domains 102 or nodes 104 as described herein. For those domains where no domain master is involved, the GM can coordinate between individual nodes of the domain, thus playing a role of a virtual domain master. The GM 124 is coupled to one or more domains 102 via one or more GM bridges 122. Coordination could be achieved by frequency coordination, time coordination, and transmit power coordination, or spatially. For frequency coordination, crosstalking domains are assigned to distinct frequency bands or channels. For time coordination, nodes of crosstalking domains are assigned to distinct time periods for communication, specifically, nodes which are subject to mutual crosstalk are assigned to transmit and receive in non-overlapping time slots or use orthogonal time-domain signals. For power coordination, crosstalking nodes of interfering domains mutually reduce the transmission power over frequencies which are affected by crosstalk. For spatial coordination, GM may suggest to switch (or move) one or more nodes from one domain to another or to split a domain into two or more thus reducing or avoiding interference.

Figure 2:
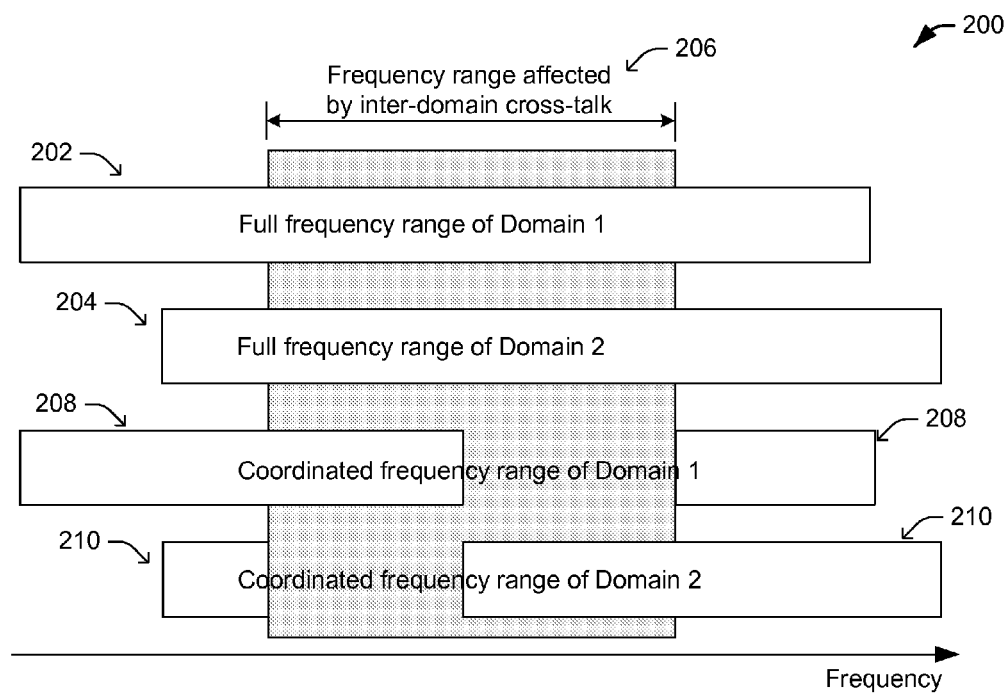
FIG. 2 illustrates one embodiment of frequency coordination.

Referring now to FIG. 2, one can see one method 200 of frequency coordination. During frequency coordination, potentially crosstalking domains switch to distinct and exclusive frequency bands in one or more frequency ranges where crosstalk severely degrades communicated signals—thus crosstalk is avoided. In FIG. 2, for example, Domain 1 has its own full frequency range 202 over which its nodes communicate, and Domain 2 has its own full frequency range 204 over which its nodes communicate. As illustrated, the domains' frequency ranges may partially or completely overlap one another. If there is no crosstalk between the domains (i.e., if both domains can communicate within their domain without interference from the other domain), this overlap is clearly acceptable. However, if crosstalk affects part of the overlapping frequency range (i.e., signals from one domain propagate into the other domain and corrupt the signals of the other domain), countermeasures must be taken to avoid signal interference. Thus, in the inter-domain crosstalk region 206, the total bandwidth is shared between the domains, the bandwidth of both domains will be less than their full frequency range 202, 204. In one embodiment to implement the shared bandwidth in the frequency range of inter-domain cross-talk, the GM estimates what bandwidth is to be granted to each domain. This estimation can be based on the reports (collections of information) from the domain masters or by other means available to GM. Next, the GM assigns a coordinated frequency band to each domain via the domain's domain master or assigns it individually, to each node of the domain, in case domain master in the domain is not used. In FIG. 2, the GM has assigned coordinated frequency range 208 to Domain 1 and coordinated frequency range 210 to Domain 2. The GM may also send coordination signals for example, at a particular time, to force both domains to use the assigned frequency bands.

Notice that usually only some of the nodes within an affected domain actually experience interference from another domain. Thus, only nodes affected by this interference have to share bandwidth, while other unaffected nodes inside the domains can use full bandwidth.

In one embodiment, nodes of the domain can use multi-carrier modulation for communication. A transmit signal of a multi-carrier transceiver comprises multiple frequency sub-carriers, each modulated by one or mode bits of data. For frequency coordination, GM can distribute the list of mutually exclusive sub-carriers or the list of mutually interfering sub-carriers to both the domain masters and individual nodes. In the first case, relevant nodes of the domain will not use these sub-carriers for transmission, while in the second case they may decide to use low bit loading over those sub-carriers.

Figure 3:
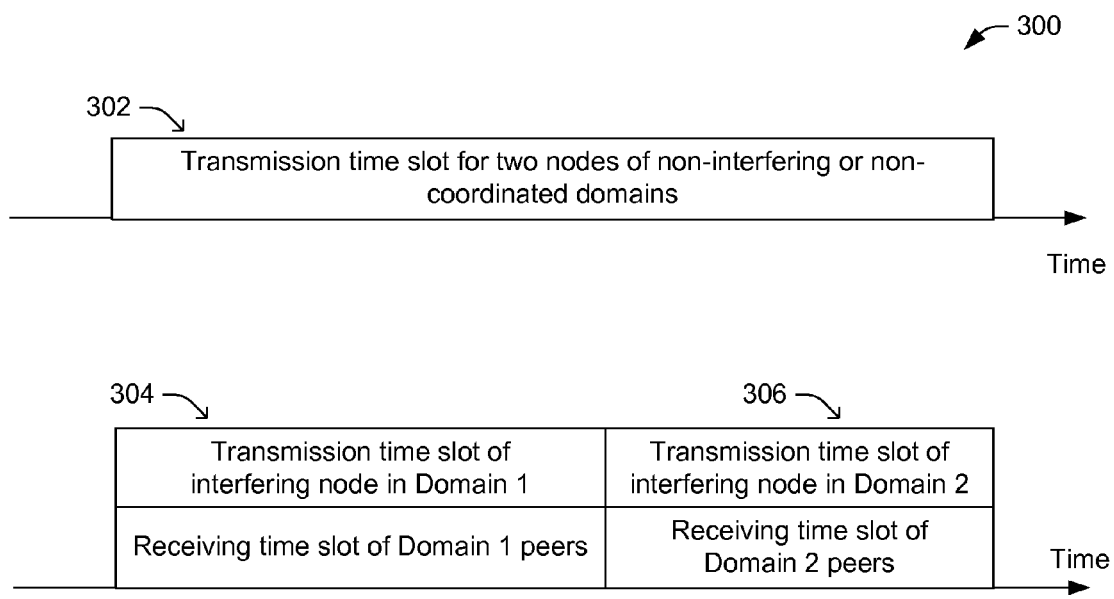
FIG. 3 illustrates one embodiment of time coordination.

Referring now to FIG. 3, one can see one embodiment for time coordination 300. Time coordination is achieved by assigning any affected nodes distinct receiving times, which has a limited overlap (or no overlap) with transmission time of the nodes affecting them. If there is no crosstalk between specific nodes of two domains, nodes of both domains can communicate with their respective peers inside their domains simultaneously (i.e., both domains could simultaneously communicate during the same transmission period 302) because their signals do not interfere with one another. However, if crosstalk exists between the nodes of two or more different domains, time coordination can combat the crosstalk by assigning any affected nodes distinct receive times. As between nodes affected by crosstalk, these receive times are coordinated so only one of the affected nodes communicates with its domain's peers at any given time (i.e., the transmission times are non-overlapping with receiving times of nodes in other domains which are the source of crosstalk). Therefore, the domains don't interfere with one another.

In FIG. 3, for example, the interfering node of Domain 1 communicates during one time period 304 while the interfering node of Domain 2 (under crosstalk from Domain 1) communicates during period 306. During time period 304, Domain 1's interfering node communicates with its peers inside Domain 1. To prevent crosstalk from affecting Domain 1's communications, Domain 2's node(s) that would cause interference in Domain 1 are silent during time period 304. Note that some of Domain 2's nodes may still communicate with each other during time 304—only the nodes causing crosstalk need be silent.

Conversely, during time period 306, Domain 2's interfering node communicates with its peers in Domain 2 while Domain 1's nodes communicating with the node under interference from Domain 2 are silent. This requires timing synchronization of transmission time periods in interfering domains. Therefore, a centralized source of time reference can be included. Timing synchronization may also be useful for frequency coordination if multi-carrier modulation is used. By synchronizing symbol boundaries in interfering domains, various orthogonal signal processing techniques could be used to simplify frequency separation.

Similar to the case of frequency coordination, the GM can estimate what transmission time periods should be granted to which nodes of the domains. This information could be collected from domain masters or individual nodes of domains or by other means available to GM. After determining the transmission time periods, the GM may force domain masters of both domains to allocate transmission time accordingly.

In some cases, interference between nodes of different domains is asymmetric. For example, some nodes in Domain 1 could cause crosstalk that disturbs some nodes in Domain 2, while the nodes in Domain 2 don't disturb nodes in Domain 1. In this case, the communication time slot or the frequency band of the nodes in Domain 1 can overlap with the transmission time slot or the transmission frequency band of the nodes in Domain 2.

Power coordination is achieved by reducing transmission power of nodes connected to the interfering parts of domains, at the frequencies where strong interference takes place. For power coordination, the GM estimates the suitable power reduction of each node of the interfering domain and communicates it to the domain masters of the interfering domains or assigns them individually to the relevant nodes of the domain if there is no domain master. Those domain masters, in turn, force relevant nodes of the domain to operate with reduced power.

Spatial coordination is achieved by switching a node from one domain to another. An example could be for wireless network, where a node is switched to the closest access point, which will allow it to reduce the transmit power and the crosstalk into other domains, respectively. Another example is splitting of a domain into two or more if QoS requirements don't allow it to reduce power or bandwidth in the domain to coordinate with other domains. Another example could be wireless networks or cable networks, where wide band and multi-channel operation is possible.

Figure 4:
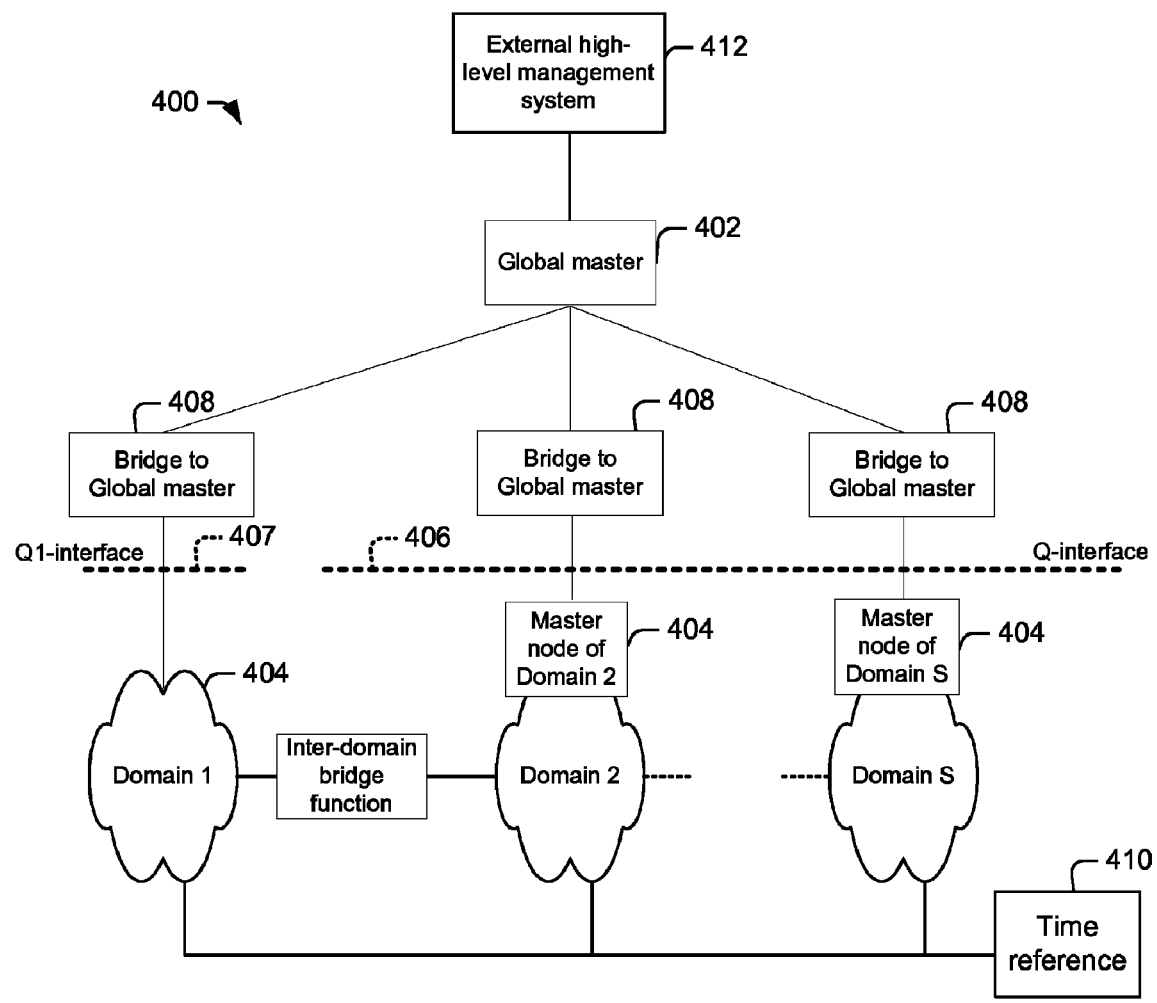
FIG. 4 is a functional diagram of coordination in a network.

FIG. 4 shows a functional diagram 400 of coordination for the case domains under coordination have domain masters. In this figure, GM 402 communicates with each of the domain masters 404 of the interfering domains or domains subject to other type of coordination via the Q-interface 406 or Q1-interface 407 and GM bridges 408. Bridges are not necessarily required, but may be used to facilitate logical or physical connection between GM and domains.

GM 402 collects from the domain master 404 relevant data on domain operation, such as allocation of communication resources of the domain between its nodes (used frequency bands and transmission time intervals), statistics and time stamps of errored frames inside domains, transmit power of each node, bit rates between pairs of nodes, estimates of compliance for QoS and other parameters. Based on the information collected from the domains, GM concludes which specific nodes or transmission paths in one domain impact other(s) and the extent of the impact. Further, GM computes the optimum or sub-optimum sharing of frequency, time, and/or the power back off of specific nodes that causes interference between domains. This optimization can be based on various criteria, but it is typically needed because both crosstalk and coordination of any type reduce performance of the nodes and it is important to set the parameters in the way that benefits of coordination are maximized. As GM obtains the necessary parameters, it communicates them to the domain masters via the Q-interface, which could be a standard or unified interface that allows for efficient connection of new domains. The domain masters apply these parameters to nodes in the domain, thereby reducing crosstalk. This procedure is iterative and may include continuous updates due to varying conditions.

The common Time Reference 410 provides time stamps for all coordinated domains. The GM may not necessarily communicate its requests in real time (which may be rather complex for powerful management systems), but may instead couple them to the Time Reference. For instance, certain parameters will be applied in all domains under coordination after a certain amount of time following a marker of the Time Reference. For some types of coordination, like frequency coordination, Time Reference is an option, and may not be needed because changes in frequency band may often be performed in different domains independently.

GM may also coordinate domains which are not managed by a domain master. For this type of management, GM communicates with each of the domain nodes directly, operating as a virtual domain master (domain 404 in FIG. 4). In this scenario, GM collects relevant information from all nodes of the domain and controls their parameters, such as frequency band, timing, or power to provide relevant type of coordination.

Another embodiment is when GM coordinates one or more domains to conform to some external requirements, implied by other (usually, higher level) management systems 412. One typical example is when domains of the home network should be coordinated with the access network sharing the same wires or operating in close proximity. The access management system may force coordination of domains (usually by conforming its power or frequency band) to avoid crosstalk into the access network.

In one embodiment, the GM 402 identifies domains by a domain ID, which is a unique value the GM generates and assigns to a domain when the domain is admitted into a coordinated group. Below are some illustrative rules of domain operation under control of the Global master.

In one embodiment of a multi-domain network, the GM 402 may coordinate some or all of the domains. For coordination, the GM 402 exchanges information with domain masters 404 of all coordinated domains via Q-interface 406 or with individual nodes of the domain via Q1-interface 407. This information contains domain-related data relevant for GM (collected by GM from the domain master or from individual nodes if no domain master is available), and control signals and data necessary for coordination between domains (sourced by GM and conveyed to the domain master or to individual nodes).

If a domain master in a particular domain is replaced (as a result of a failure or some other reason), the GM 402 may be re-connected (by a GM Bridge 408) to the new-selected domain master.

The information exchange protocol between GM and a domain master (or individual nodes) is typically unified for all domains. The GM identifies a domain by its Domain ID, which is assigned by the GM for the purpose of communication. The Domain ID of any domain which is not involved in communication with GM could have a default value.

In the illustrated systems and methods, the GM could identify domains which are problematic from the perspective of mutual interference. This could be achieved by analyzing correlation between error performance in one domain (or in a part of it) and transmission activity of other domain (or part of it). Since the number of domains that GM can coordinate simultaneously may be smaller than the number of domains in the network subject for mutual interference, GM should "scan" all possible combinations to identify the domains. During the process of scanning, GM assigns Domain IDs to each of the currently analyzed domains and runs a test to identify correlation. This test may include enforcing silence periods in one domain (or part of it) to identify crosstalk introduced by others.

Another way of crosstalk identification is by running special patterns (sequences) in the transmission time slots of the nodes in one domain to identify "cross-impact" of nodes in other domains. In one implementation, a specific pattern may be used as a preamble of every transmitted frame by suspicious nodes of the domain, while these patterns can be detected in other domains. In another implementation, a special predefined frame, intended for crosstalk identification, is sent by the assigned nodes.

Coordination between capabilities to communicate services with high-speed-and-quality requirements and services with low-speed/low-quality requirements is used for overall network optimization. Collecting information from domain masters allows GM to generate an input to relevant domain masters on resource allocation inside domains which will optimize service propagation from through several independent domains (e.g., if a DVR is connected to the power-line domain and a TV is connected to the phone-line domain, and both domains are connected by inter-domain bridge). To get the high-quality service between DVR and TV in both domains relevant routes should have corresponding resources allocated. In case both domains have sufficient resources for all services, no problem may occur. However, if resources are short, services with same priority inside domain will get equal share of resources. Global master can instruct the domain Master for extra priority to a specific service due to its global importance in the network.

Another possibility of network optimization is splitting a domain (also, as one way of spatial coordination). This is possible when there are two or more permanent groups of nodes inside a domain, such that nodes on each group talk only with each other (for instance, nodes 1, 5, 7 are talking only between them and not with other nodes, like two TVs, and a DVR). In this case a domain can be "split", i.e. a separate new domain can be arranged from nodes 1, 5, 7. Splitting of a domain can be done by a domain master, but the global master should coordinate the split domain with the other domains to ensure that the new domain will not interact with the existing domains of the network. If a domain is split to another channel, it significantly increases the capacity of the network.

With regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising". In addition, to the extent that the terms "number", "plurality", "series", "some" or variants thereof are used in the detailed description or claims, such terms are to include any number including, but not limited to: all positive integers, all negative integers, and other values therebetween.

What is claimed is:

1. A multi-domain network, comprising:
   a first network domain comprising a first domain master that facilitates communication among a first plurality of nodes in the first network domain, the first plurality of nodes adapted to communicate with one another via first domain signals;
   a second network domain comprising a second domain master that facilitates communication among a second plurality of nodes in the second network domain, the second plurality of nodes adapted to communicate with one another via second domain signals;
   a global master configured to identify crosstalk generated by communication between a first pair of nodes in the first network domain and where the identified crosstalk degrades communication between a second pair of nodes in the second network domain;
   the global master further configured to provide global signals to the first domain master and the second domain master to instruct at least one node in the first pair to reduce a power at which the at least one node transmits, thereby limiting the crosstalk.

2. The multi-domain network of claim 1, where the global signals instruct the first pair of nodes to transmit data at a first time and instruct the second pair of nodes to transmit data at a second time that is non-overlapping with the first time, thereby limiting the crosstalk.

3. The multi-domain network of claim 1, where the global signals instruct the first pair of nodes to transmit data over a first frequency range and instruct the second pair of nodes to transmit data over a second frequency range that is non-overlapping with the first frequency range, thereby limiting the crosstalk.

4. The multi-domain network of claim 1:
   where the first domain signals collectively span a first frequency range used in the first network domain; and
   where the second domain signals collectively span a second frequency range used in the second network domain, the second frequency range differing from the first frequency range.

5. The multi-domain network of claim 1, further comprising:
   an inter-domain bridge coupled between the first network domain and the second network domain, the inter-domain bridge configured to provide logical signals in accordance with an upper level protocol between the first and second network domains.

6. A method for coordinating signals within a multi-domain network, comprising:
   transmitting first domain signals from a first node to a second node over a first communication medium, where the first and second nodes reside in a first network domain that includes a first network domain master;
   transmitting second domain signals from a third node to a fourth node over a second communication medium, where the third and fourth nodes reside in a second network domain that includes a second network domain master;
   determining that transmissions from the first node to the second node generate crosstalk that degrades quality of the second domain signals received at the fourth node; and
   providing global signals to at least one of the first and second network domain masters to reduce a power at which the first node transmits to the second node, thereby limiting the crosstalk interference.

7. The method of claim 6:

where the first communication medium comprises a first type of communication medium on which first domain signals spanning a first frequency range are communicated between the first and second nodes; and where the second communication medium comprises a second type of communication medium that differs from the first type of medium, and where second domain signals spanning a second frequency range are communicated between the third and fourth nodes, the second frequency range differing from the first frequency range.

8. The multi-domain network of claim 1, wherein the first pair of nodes in the first network domain exchange data directly with each other without passing the data through the first domain master or another node in the first network domain.

9. The multi-domain network of claim 8, wherein the second pair of nodes in the second network domain exchange data directly with each other without passing the data through the second domain master or another node in the second network domain.

10. The method of claim 6, wherein the first and second nodes in the first network domain exchange data directly with each other without passing the data through the first network domain master or another node in the first network domain.

* * * * *